(12) United States Patent
Vismonte et al.

(10) Patent No.: US 11,050,843 B2
(45) Date of Patent: Jun. 29, 2021

(54) SYSTEMS AND METHODS FOR PREFETCHING CONTENT

(71) Applicant: Facebook, Inc., Menlo Park, CA (US)

(72) Inventors: Mark A. Vismonte, New York, NY (US); Azriel Fuchs, New York, NY (US); Fnu Hendri, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 18 days.

(21) Appl. No.: 15/955,625

(22) Filed: Apr. 17, 2018

(65) Prior Publication Data

US 2019/0306273 A1    Oct. 3, 2019

Related U.S. Application Data

(60) Provisional application No. 62/651,019, filed on Mar. 30, 2018.

(51) Int. Cl.
| | |
|---|---|
| *G06F 15/16* | (2006.01) |
| *H04L 29/08* | (2006.01) |
| *G06Q 50/00* | (2012.01) |
| *H04L 29/06* | (2006.01) |

(52) U.S. Cl.
CPC .......... *H04L 67/327* (2013.01); *G06Q 50/01* (2013.01); *H04L 65/4084* (2013.01); *H04L 67/12* (2013.01)

(58) Field of Classification Search
CPC ... H04L 65/4084; H04L 67/327; H04L 67/12; H04L 67/02; G06Q 50/01
See application file for complete search history.

(56) References Cited

U.S. PATENT DOCUMENTS

| | | | |
|---|---|---|---|
| 7,028,096 B1 * | 4/2006 | Lee | H04N 7/17336 348/E7.073 |
| 7,975,025 B1 | 7/2011 | Szabo | |
| 9,544,388 B1 * | 1/2017 | Li | G06F 21/10 |
| 2002/0116473 A1 * | 8/2002 | Gemmell | H04L 29/06027 709/219 |
| 2005/0149965 A1 * | 7/2005 | Neogi | H04H 60/46 725/14 |
| 2005/0235330 A1 * | 10/2005 | O'Donnell | H04N 7/17336 725/87 |
| 2007/0294333 A1 * | 12/2007 | Yang | H04N 21/234327 709/203 |
| 2008/0155623 A1 * | 6/2008 | Ota | H04N 7/173 725/109 |

(Continued)

OTHER PUBLICATIONS

International Application No. PCT/US2018/028202, International Search Report and Written Opinion dated Jan. 2, 2019.

(Continued)

*Primary Examiner* — Cheikh T Ndiaye
(74) *Attorney, Agent, or Firm* — Sheppard Mullin Richter & Hampton LLP

(57) ABSTRACT

Systems, methods, and non-transitory computer-readable media can receive, from a client computing device, a request for a first portion of a content item. The first portion of the content item is determined based on a likelihood of consumption value associated with the content item. The first portion of the content item is transmitted to the client computing device. The first portion of the content item is prefetched by the client computing device.

20 Claims, 7 Drawing Sheets

(56) References Cited

U.S. PATENT DOCUMENTS

| | | | |
|---|---|---|---|
| 2013/0151651 A1 | 6/2013 | Chhaochharia | |
| 2013/0238751 A1* | 9/2013 | Raleigh | H04L 67/26 |
| | | | 709/217 |
| 2014/0359009 A1* | 12/2014 | Shih | G06Q 50/01 |
| | | | 709/204 |
| 2015/0201001 A1 | 7/2015 | Cabanillas et al. | |
| 2015/0358689 A1 | 12/2015 | Wen | |
| 2016/0205209 A1 | 7/2016 | Kapadia | |
| 2017/0149860 A1 | 5/2017 | Eli et al. | |
| 2017/0289213 A1 | 10/2017 | Chen et al. | |
| 2018/0091617 A1 | 3/2018 | Filiz | |
| 2018/0199075 A1* | 7/2018 | Wang | H04N 21/8456 |
| 2018/0302630 A1* | 10/2018 | Copley | H04N 19/172 |
| 2018/0352269 A1* | 12/2018 | Patil | H04N 21/23106 |
| 2019/0230186 A1* | 7/2019 | Yellin | H04L 67/2847 |

OTHER PUBLICATIONS

Bar, Tomer, "Adopting Progressive JPEG in Facebook for iOS", Jan. 25, 2015, retrieved from the intered on Mar. 12, 2019, http://code.fb.com/ios/faster-photos-in-facebook-for-ios/ (4 pages).

* cited by examiner

400

Receive from a client computing device a request for a first portion of a content item, wherein the first portion is determined based on a likelihood of consumption value associated with the content item
402

Transmit the first portion of the content item to the client computing device, wherein the first portion of the content item is prefetched by the client computing device
404

FIGURE 4

SYSTEMS AND METHODS FOR PREFETCHING CONTENT

CROSS-REFERENCE TO RELATED APPLICATIONS

This application claims priority to U.S. Provisional Patent Application No. 62/651,019, filed on Mar. 30, 2018 and entitled "SYSTEMS AND METHODS FOR PREFETCHING CONTENT", which is incorporated herein by reference in its entirety.

FIELD OF THE INVENTION

The present technology relates to the field of content distribution. More particularly, the present technology relates to techniques for distributing content to users in a computer networking environment.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to receive, from a client computing device, a request for a first portion of a content item. The first portion of the content item is determined based on a likelihood of consumption value associated with the content item. The first portion of the content item is transmitted to the client computing device. The first portion of the content item is prefetched by the client computing device.

In an embodiment, the content item is divided into a plurality of segments, and the first portion comprises a subset of the plurality of segments.

In an embodiment, each segment of the plurality of segments is associated with rendering the content item at a particular level of quality.

In an embodiment, the plurality of segments are ordered in an order such that higher placement within the order is indicative of a higher level of quality.

In an embodiment, the content item is an image encoded in a progressive JPEG format.

In an embodiment, each segment of the plurality of segments is associated with a range of likelihood of consumption values.

In an embodiment, a request is received from the client computing device for a remaining portion of the content item. The remaining portion of the content item is transmitted to the client computing device.

In an embodiment, the request for the remaining portion of the content item is generated based on a determination that the content item is to be presented on the client computing device.

In an embodiment, a request is received from a client computing device for a first portion of a second content item. The first portion of the second content item is determined based on a likelihood of consumption value associated with the second content item. The first portion of the second content item is transmitted to the client computing device. The first portion of the second content item is prefetched by the client computing device.

In an embodiment, the likelihood of consumption value associated with the content item is determined based on a machine learning model.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates example method associated with smart prefetching of content items, according to an embodiment of the present disclosure.

Figure 1:
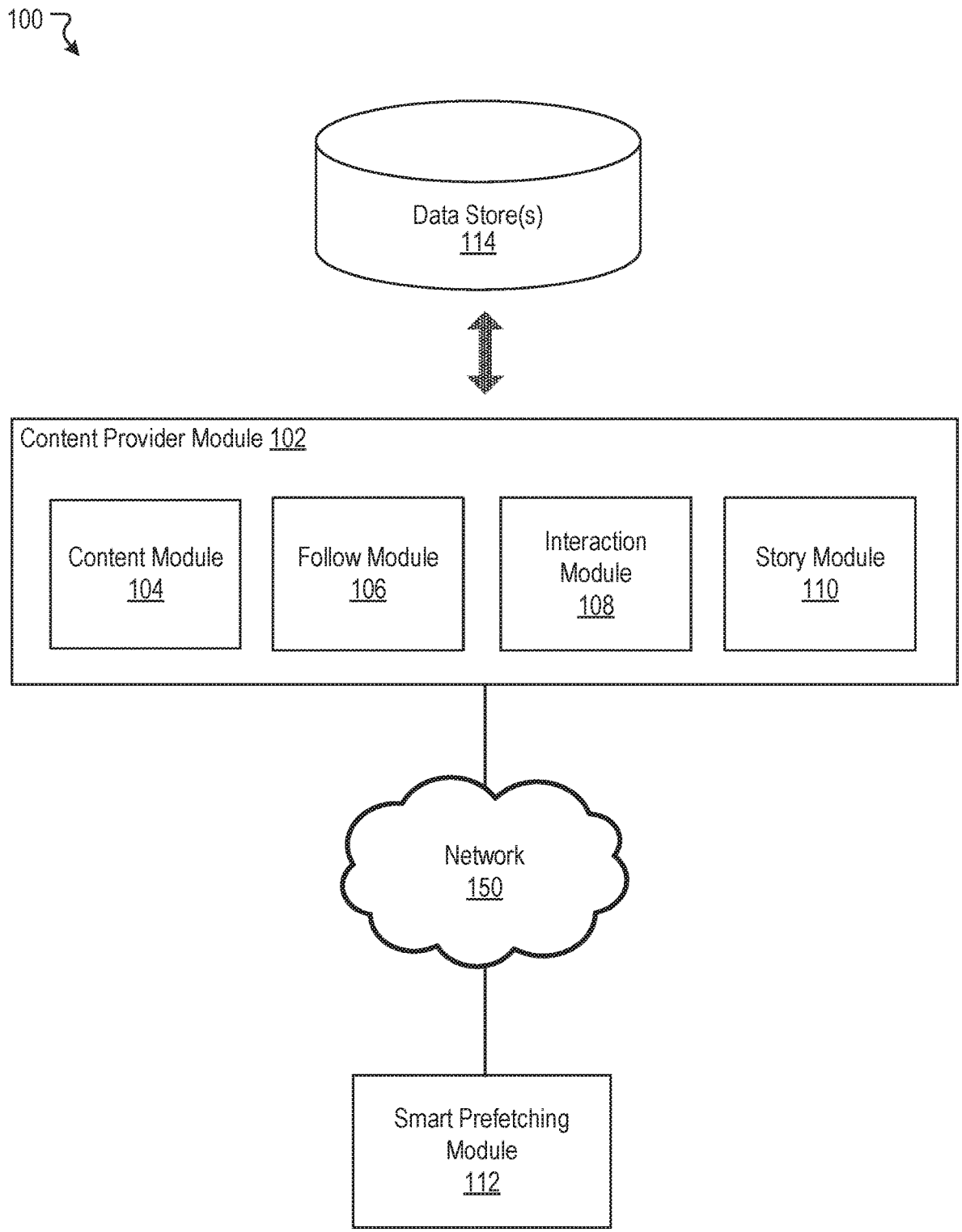
FIG. 1 illustrates an example system including a content provider module and a smart prefetching module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Prefetching Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user.

Under conventional approaches, a user typically interacts with the social networking system through a software application running on a computing device. This software application typically relies on a network connection (e.g., Internet connection) between the computing device and the social networking system. In some instances, such network connections may be interrupted for a number of reasons. In such instances, the software application is generally unable to operate as intended. For example, the user may no longer be able to access (e.g., view) content through the software application. Such restrictions can negatively impact user experience with the social networking system. Furthermore, content feeds may include a large number of content items, such that a user may view and/or interact with a large number of content items in a short period of time. As such, in certain scenarios, even if a network connection is not interrupted, it may be difficult to acquire content items in real-time as a user scrolls through a content feed. In such scenarios, user experience may be hampered by long load times and interrupted interaction with content items.

Certain conventional approaches attempt to address some of these problems by prefetching content. Prefetching a content item can generally be understood to include downloading a content item to a client computing device before the content item is needed, such that when the content item is needed (e.g., when the content item is to be presented on the client computing device), it can be loaded substantially instantaneously without having to retrieve the content item over a network connection. However, conventional approaches to prefetching content have various shortcomings. For example, if a content item is prefetched for a user, but the user does not end up viewing the content item, the computing resources required to prefetch the content item have been wasted. Relatedly, if a content item is not prefetched for a user, but the user does eventually attempt to view the content item, the user must wait for the content item to be retrieved in real-time over the network connection which, as mentioned above, can result in delayed load times and non-optimal user experience.

Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In general, one or more content items can be identified for potential presentation to a user. Each content item of the one or more content items can be associated with a likelihood of consumption value indicative of a likelihood that the user will consume (e.g., view) the content item. A prefetch determination can be made for at least some of the one or more content items. The prefetch determination for a particular content item can include determining a first portion of the content item to be prefetched. In an embodiment, when a content item (or a portion of a content item) is prefetched, the content item (or portion of the content item) is provided to a client computing device prior to a user request to view the content item and/or before the content item is to be presented on the client computing device. Similarly, if a client computing device "prefetches" a content item (or a portion of a content item) the client computing device can be understood to be retrieving and/or requesting the content item (or the portion of the content item) before the client computing device needs the content item (e.g., before the content item is to be presented on the client computing device). In this way, when the content item is to be presented on the client computing device, the content item (or portion of the content item) is already saved locally to the client computing device such that content item can be loaded more quickly.

In an embodiment, a portion of a content item to be prefetched (e.g., a first portion of the content item) can be determined based on the likelihood of consumption value associated with the content item. For example, if the content item has a relatively high likelihood of consumption, the first portion may represent a relatively large portion of the content item, whereas if the content item has a relatively low likelihood of consumption, the first portion can represent a relatively small portion of the content item. The client computing device can prefetch the first portion of the content item. At a later time, a remaining portion of the content item can be provided to the client computing device. For example, the remaining portion of the content item can be provided to the client computing device based on a determination that the content item is to be presented on the client computing device. More details relating to the disclosed technology are provided below.

FIG. 1 illustrates an example system 100 including a content provider module 102 and a smart prefetching module 112, according to an embodiment of the present disclosure. As shown in the example of FIG. 1, the content provider module 102 can include a content module 104, a follow module 106, an interaction module 108, and a story module 110. In some instances, the example system 100 can include at least one data store 114. The smart prefetching module 112 can interact with the content provider module 102 over one or more networks 150 (e.g., the Internet, a local area network, etc.). The smart prefetching module 112 can be implemented in a software application (e.g., a social networking application) running on a computing device. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 and/or the smart prefetching module 112 can be implemented in any suitable combinations.

In some embodiments, the content provider module 102 and/or the smart prefetching module 112 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 and/or the smart prefetching module 112 can be, in part or in whole, implemented as software running on one or more computing devices or systems, such as on a server system or a client computing device. In some instances, the content provider module 102 and/or the smart prefetching module 112 can be, in part or in whole, implemented within or configured to operate in conjunction with or be integrated with a social networking system (or service), such as a social networking system 630 of FIG. 6. Likewise, in some instances, the content provider module 102 and/or the smart prefetching module 112 can be, in part or in whole, implemented within or configured to operate in conjunction with or be integrated with a client computing device, such as the user device 610 of FIG. 6. For example, the content provider module 102 and/or the smart prefetching module 112 can be implemented as or within a dedicated application (e.g., app), a program, or an applet running on a user computing device or client computing system. The application incorporating or implementing instructions for performing functionality of the content provider module 102 and/or the smart prefetching module 112 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data.

The content module 104 can be configured to provide users with access to content that is posted through a content provider (e.g., a social networking system). For example, the content module 104 can provide a first user with access to content items through an interface. This interface may be provided through a display of a computing device being accessed by the first user in which the smart prefetching module 112 is implemented. The first user can also interact with the interface to post content items to the social networking system. Such content items may include text, images, audio, and videos, for example. For example, the first user can submit a post to be published through the social networking system. In some embodiments, the post can include, or reference, one or more content items.

In various embodiments, other users of a social networking system can access content items posted by the first user. In one example, the other users can access the content items by searching for the first user by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user interaction are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user interaction can include emoji-based reactions to a content item (e.g., selecting an option that corresponds to a particular reaction emoji, e.g., happy, sad, angry, etc.) and re-sharing a content item, for example. In some embodiments, such information can be stored in a social graph as described in reference to FIG. 6.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., after 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the smart prefetching module 112 can be configured to provide functionality for prefetching content provided by the content provider module 102. More details regarding the smart prefetching module 112 will be provided below with reference to FIG. 2.

Figure 2:
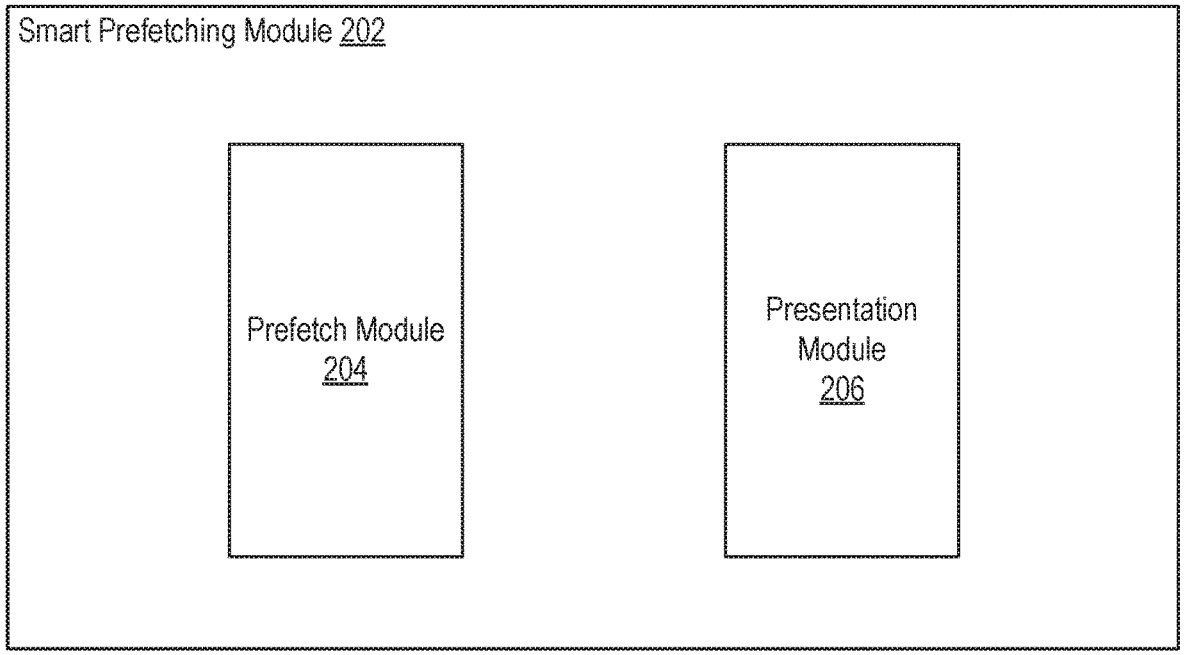
FIG. 2 illustrates an example smart prefetching module, according to an embodiment of the present disclosure.

FIG. 2 illustrates an example smart prefetching module 202 according to an embodiment of the present disclosure. In some embodiments, the smart prefetching module 112 of FIG. 1 can be implemented as the smart prefetching module 202. As shown in the example of FIG. 2, the smart prefetching module 202 can include a prefetch module 204 and a presentation module 206. The smart prefetching module 202 may be implemented in a software application (e.g., social networking application) running on a computing device.

The prefetch module 204 can be configured to receive information pertaining to one or more content items that have been identified for potential presentation to a user. For example, the one or more content items may have been identified by the content provider module 102 for potential inclusion in a content feed associated with the user. The information pertaining to the one or more content items may also be provided by the content provider module 102. The information pertaining to the one or more content items can include, for example, identifying information for each of the one or more content items (e.g., a file name, a file location, or other identifying information), and likelihood of consumption values for each of the one or more content items. In an embodiment, the likelihood of consumption value for a given content item may be indicative of a likelihood that the user will view the content item. The likelihood of consumption value can be determined, for example, based on user characteristics associated with the user, such as the user's viewing habits, content the user is interested in, and so forth. In an embodiment, the likelihood of consumption value may be determined based on a machine learning model that has be trained to determine a likelihood that a particular user having a particular set of user characteristics will view a particular content item having a particular set of content characteristics. In one example, the likelihood of consumption value may be a value between 0 and 1, with a lower value indicating a lower likelihood of the user viewing the content item, and a higher value indicating a higher likelihood of the user viewing the content item. In various embodiments, likelihood of consumption values may be determined by the content provider module 102 and/or by the prefetch module 204.

The prefetch module 204 can be configured to prefetch at least a portion of at least some of the one or more content items. The prefetch module 204 can store the prefetched portions of the one or more content items locally on a computing device (e.g., on a local cache). As mentioned above, downloading a content item or a portion of a content item from a content provider before the content item is needed (e.g., before the content item is to be presented) can be referred to as prefetching. When content items, or portions of content items, are prefetched for a software application, user experience using the software application can be improved. For example, if a user opens a social networking system application, any prefetched content items can be displayed very quickly, since they have already been downloaded and stored locally. Similarly, if a portion of a content item has been prefetched, then only a remaining portion of the content item needs to be downloaded, and the content item can be displayed more quickly than if the entire content item had to be downloaded.

In an embodiment, a content item can be segmented into a plurality of segments. The prefetch module 204 can be configured to identify a subset of the plurality of segments to be prefetched based on a likelihood of consumption value associated with the content item. For example, if a content item is divided into nine segments, the prefetch module 204 can request (e.g., from the content provider module 102) a particular number of the nine segments based on a likelihood of consumption value associated with the content item. In one embodiment, each segment of a content item can be associated with a range of likelihood of consumption values. For example, a first range of likelihood of consumption values (e.g., 0-0.1) may result in requesting one segment of the content item, a second range of likelihood of consumption values (e.g., 0.1-0.2) may result in requesting two segments of the content item, a third range of likelihood of consumption values (e.g., 0.2-0.3) may result in requesting three segments of the content item, and so forth. In an embodiment, a higher likelihood of consumption value can result in a greater number of segments being prefetched, and a lower likelihood of consumption value can result in a lower number of segments being prefetched.

In certain embodiments, a content item can be configured such that the content item can be rendered even if only a portion of the content item has been downloaded. In an embodiment, a content item can be rendered to fill a viewport associated with the content item even if only a portion of the content item has been downloaded. For example, a content item can be divided into a plurality of segments. Each segment can be configured such that it allows for rendering of the entire content item, with different segments allowing for rendering of the content item at different levels of quality. In one embodiment, the plurality of segments can be ordered (e.g., arranged in a hierarchical fashion), such that segments can build upon earlier-ordered segments to render the content item at progressively higher qualities. For example, if a content item is divided into nine segments, a first segment can allow for the entire content item to be rendered at a first, lowest quality; a second segment can build upon the first segment to render the entire content item at a second quality that is higher than the first quality; a third segment can build upon the first and second segments to render the entire content item at a third quality that is higher than the second quality, and so forth. If all nine segments of the content item are downloaded, the content item can be rendered at an optimal quality using all nine segments of the content item. One example of content items configured in this manner are images encoded in a progressive JPEG format. In such embodiments, even if only a portion of a content item is prefetched, the entire content item can still be rendered and presented, albeit at a lesser quality than had all segments of the content item been downloaded. In such embodiments, the prefetch module 204 can be configured to request a particular set of segments for a content item. For example, if the prefetch module 204 determines that one segment of a content item should be prefetched, rather than requesting any one segment, the prefetch module 204 can specifically request a first segment of an ordered set of segments. Or if the prefetch module 204 determines that three segments of a content item should be prefetched, the prefetch module 204 can specifically request the first three segments of an ordered set of segments associated with the content item.

The presentation module 206 can be configured to present content items within a software application running on a computing device. The content items may be presented on a display associated with the computing device. In an embodiment, when a user interacts with a software application, the presentation module 206 can be configured to load and render content items associated with the software application for presentation to the user. For example, as a user interacts with a content feed presented within the software application, content items can be rendered within the content feed. In an embodiment, if a content item is to be presented to the user, and a portion of the content item has been prefetched, the content item can be rendered at a first quality based on the portion of the content item that has been prefetched. For example, if a content item comes into view within a content feed (e.g., a viewport associated with the content item comes into view within the content feed), and a first portion of the content item has been prefetched, the content item can be rendered at a first quality based on the first portion. The presentation module 206 can be configured to request a remaining portion of the content item. For example, the presentation module 206 can send a request to a content provider (e.g., the content provider module 102) for a remaining portion of the content item. The presentation module 206 can receive the remaining portion of the content item. The presentation module 206 can render the content item at a second, higher quality based on the remaining portion of the content item. For example, consider an example scenario in which an image is divided into nine segments, and four of the nine segments (segments 1-4) have been prefetched. When a viewport associated with the image comes into view within a content feed, the image can be rendered at a first quality using the four prefetched segments. The presentation module 206 can request the remaining five segments (segments 5-9) from a content provider. Once the remaining five segments are received, the presentation module 206 can render the image at a second, higher quality using all nine segments of the image.

Figure 3:
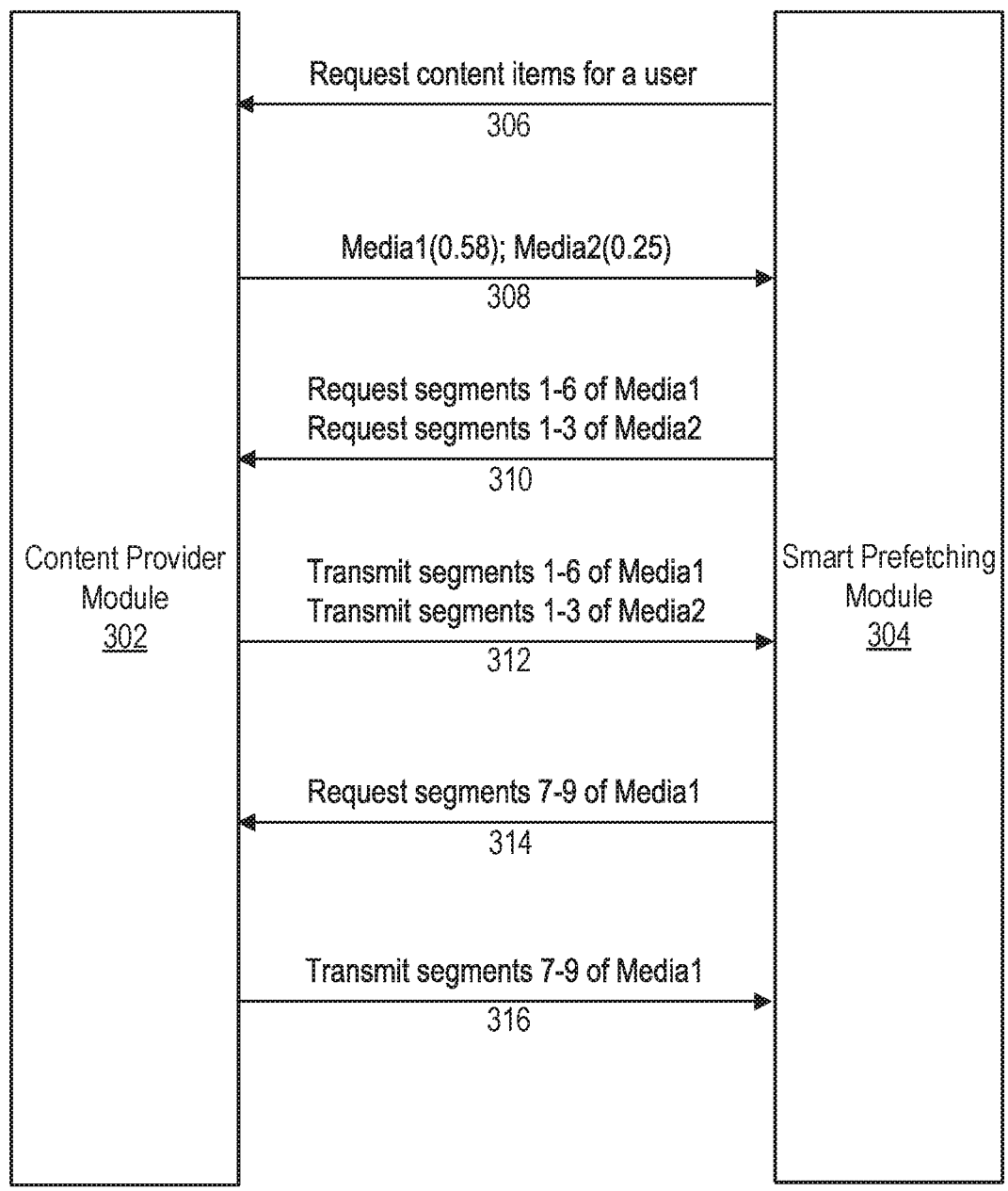
FIG. 3 illustrates an example scenario including a timing diagram depicting interactions between a smart prefetching module and a content provider module, according to an embodiment of the present disclosure.

FIG. 3 illustrates an example scenario 300 represented by a timing diagram which demonstrates an example set of interactions between a content provider module 302 and a smart prefetching module 304, according to an embodiment of the present disclosure. In some embodiments, the content provider module 302 can be implemented as the content provider module 102 of FIG. 1, and the smart prefetching module 304 can be implemented as the smart prefetching module 112 of FIG. 1. In an embodiment, the content provider module 302 can be associated with a content provider (e.g., one or more servers associated with a social networking system), and the smart prefetching module 304 can be associated with a client computing device.

In the example scenario 300, the smart prefetching module 304 requests that the content provider module 302 identify one or more content items for potential presentation to a user at step 306. For example, the smart prefetching module 304 may be requesting that a content provider identify one or more content items for potential presentation within a content feed associated with the user. At step 308, the content provider module 302 identifies one or more content items that can be presented to the user, and responds with information pertaining to the one or more content items. The information can include identifying information for the one or more content items, and likelihood of consumption values for the one or more content items. In the example scenario 300, the content provider module 302 has identified two content items, Media1 and Media2. Media1 has a likelihood of consumption value of 0.58, and Media2 has a likelihood of consumption value of 0.25. In the example scenario 300, the likelihood of consumption values indicate that the user has a higher likelihood of consuming Media1 and a lower likelihood of consuming Media2.

At step 310, the smart prefetching module 304 then generates and transmits a request to prefetch a first portion of Media1 and a first portion of Media2. In the example scenario 300, each content item is divided into nine segments, and the smart prefetching module 304 has requested segments 1-6 of Media1 and segments 1-3 of Media2. The portions of the content items to be prefetched, i.e., segments 1-6 of Media1 and segments 1-3 of Media2, have been determined based on the likelihood of consumption values associated with the content items. For example, in the example scenario 300, the number of segments to be prefetched have been determined according to the following example table:

| Likelihood of consumption values | Number of segments to be prefetched |
| --- | --- |
| 0-0.1 | 1 |
| >0.1 and ≤0.2 | 2 |
| >0.2 and ≤0.3 | 3 |
| >0.3 and ≤0.4 | 4 |
| >0.4 and ≤0.5 | 5 |
| >0.5 and ≤0.6 | 6 |
| >0.6 and ≤0.7 | 7 |
| >0.7 and ≤0.8 | 8 |
| >0.8 and ≤1 | 9 |

Media1 has a likelihood of consumption value of 0.58. As such, segments 1-6 are prefetched for Media1. Media2 has a likelihood of consumption value of 0.25. As such, segments 1-3 are prefetched for Media2. In various embodiments, translation or mapping of a likelihood of consumption value to a number of segments to be prefetched can be conducted by either the content provider module 302 or the smart prefetching module 304. At step 312, in response to the request from the smart prefetching module 304, the content provider module 302 transmits segments 1-6 of Media1 and segments 1-3 of Media2.

At a later time, the smart prefetching module 304 requests the remaining portion of Media1, i.e., segments 7-9, at step 314. In an embodiment, the smart prefetching module 304 may generate and transmit this request based on a determination that Media1 is to be presented to the user. For example, if a viewport associated with Media1 comes into view in a content feed, the smart prefetching module 304 can generate a request for the remaining portion of Media1. In response to the request, the content provider module 302 transmits segments 7-9 of Media1 at step 316. In an embodiment, the smart prefetching module 304 can initially present the user with Media1 at a first quality based on prefetched segments 1-6. Once the remaining segments 7-9 are received, the smart prefetching module 304 can then present Media1 at a second quality based on the newly received segments 7-9. The second quality may be of a higher quality than the first quality. For example, Media1 presented in the second, higher quality may show finer details than Media1 presented in the first, lower quality. As referenced, the scenario 300 is an example of the present technology. For example, the values in the table mapping likelihood of consumption values to number of segments to be prefetched, as set forth above, can be changed to reflect any other values suitable for a given implementation. As another example, while the distance between steps 310-316 reflected in FIG. 3 appears to be the same, the time duration between the performance of the steps 310-316 can be unequal and can change depending on the implementation.

FIG. 4 illustrates an example method 400 associated with smart prefetching of content items, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can receive from a client computing device a request for a first portion of a content item, wherein the first portion is determined based on a likelihood of consumption value associated with the content item. At block 404, the example method 400 can transmit the portion of the content item to the client computing device, wherein the first portion of the content item is prefetched by the client computing device.

Figure 5:
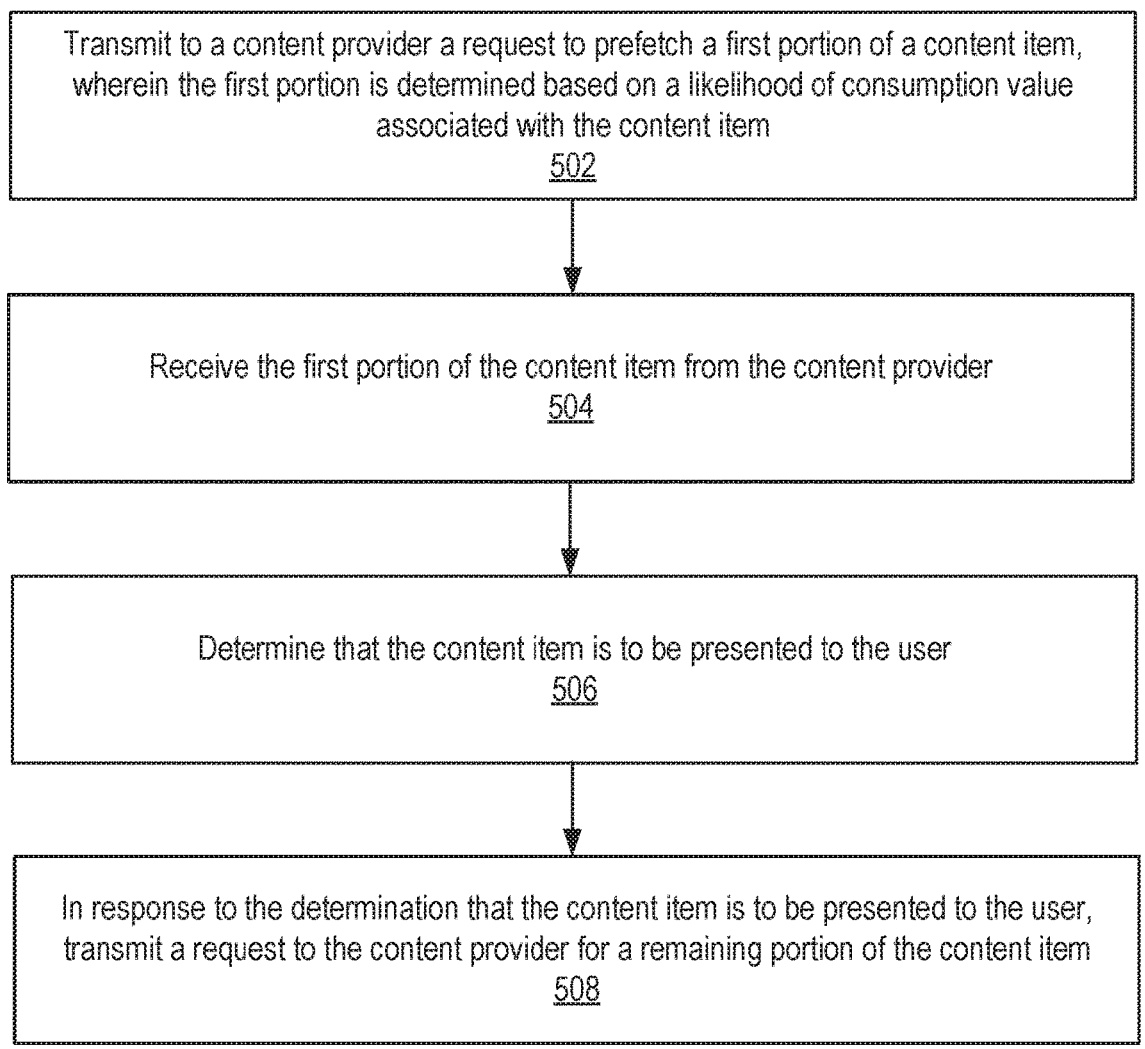
FIG. 5 illustrates another example method associated with smart prefetching of content items, according to an embodiment of the present disclosure.

FIG. 5 illustrates an example method 500 associated with smart prefetching of content items, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can transmit to a content provider a request to prefetch a first portion of a content item, wherein the first portion is determined based on a likelihood of consumption value associated with the content item. At block 504, the example method 500 can receive the first portion of the content item from the content provider. At block 506, the example method 500 can determine that the content item is to be presented to the user. At block 508, the example method 500 can, in response to the determination that the content item is to be presented to the user, transmit a request to the content provider for a remaining portion of the content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
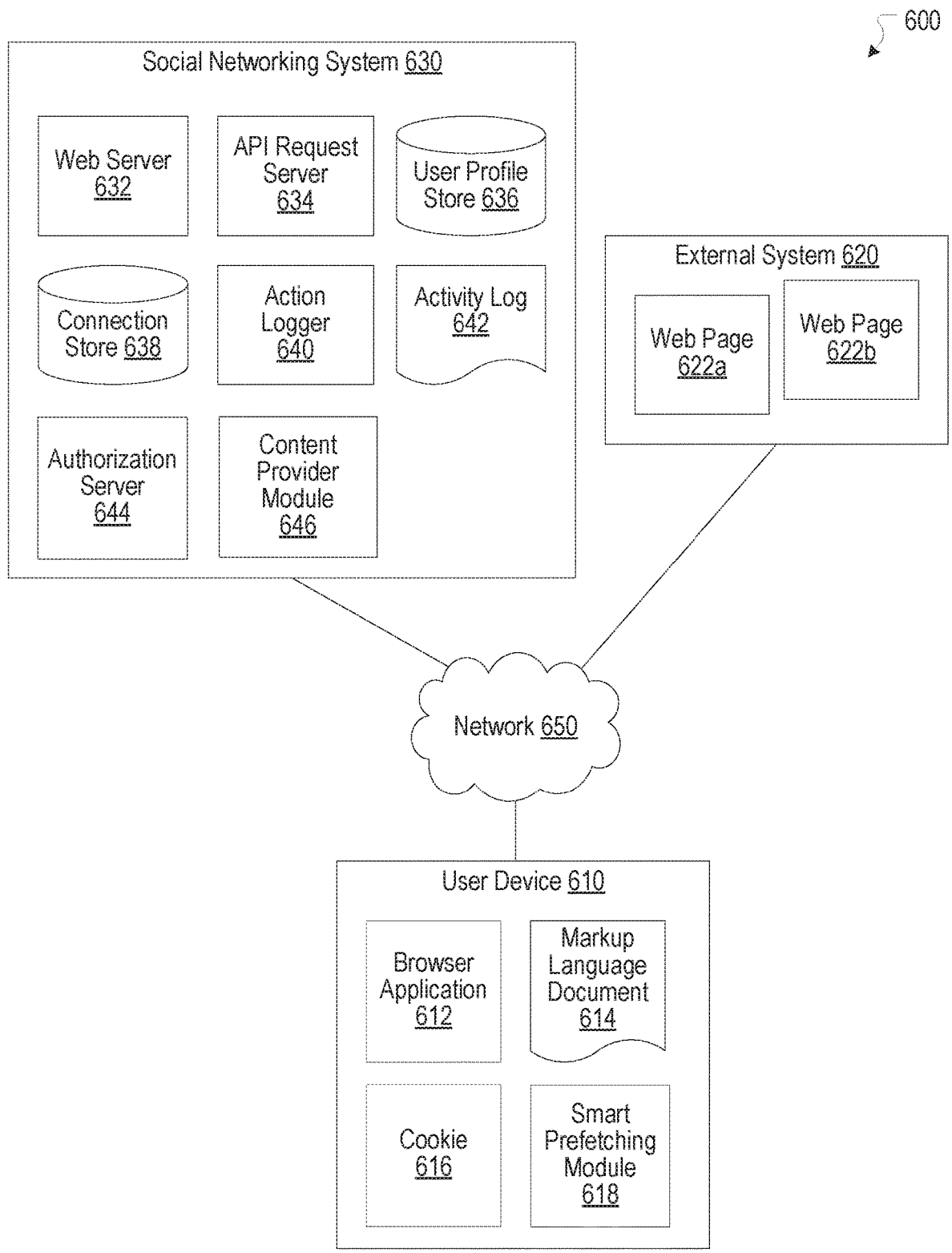
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. In some embodiments, one or more functionalities of the content provider module 646 can be implemented in the user device 610. In some embodiments, the user device 610 can include a smart prefetching module 618. The smart prefetching module 618 can, for example, be implemented as the smart prefetching module 112, as discussed in more detail herein. In some embodiments, one or more functionalities of the smart prefetching module 618 can be implemented in the social networking system 630. As discussed previously, it should be appreciated that there can be many variations or other possibilities.

Hardware Implementation

Figure 7:
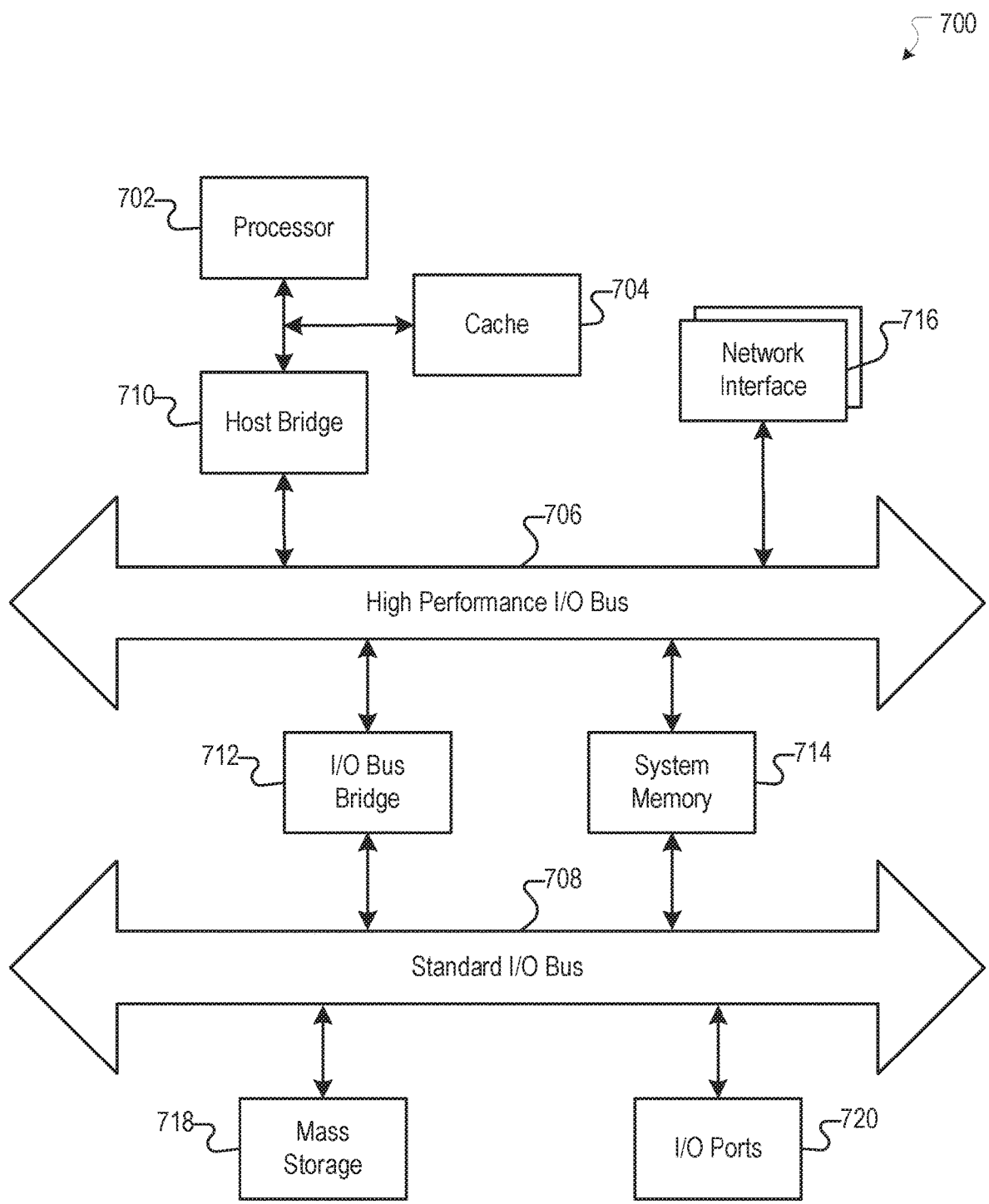
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a content item for potential presentation on a client computing device associated with a user;
   transmitting, by the computing system, to the client computing device a likelihood of consumption value associated with the content item and the user;
   receiving, by the computing system, from the client computing device, a request for a first portion of the content item, wherein
   the content item is an image divided into a plurality of segments,
   a number of segments of the plurality of segments to be prefetched is determined based on the likelihood of consumption value,
   the first portion comprises a subset of the plurality of segments determined based on the number of segments, and
   the first portion is associated with a reduced quality representation of the image; and
   transmitting, by the computing system, the first portion of the content item to the client computing device.

2. The computer-implemented method of claim 1, wherein each segment of the plurality of segments is associated with rendering the content item at a particular level of quality.

3. The computer-implemented method of claim 2, wherein the plurality of segments are ordered in an order such that higher placement within the order is indicative of a higher level of quality.

4. The computer-implemented method of claim 3, wherein the content item can be rendered at a first quality based on a first segment at a first position in the order, and the content item can be rendered at a second quality that is higher than the first quality based on the first segment and a second segment at a second position in the order.

5. The computer-implemented method of claim 1, wherein each segment of the plurality of segments is associated with a range of likelihood of consumption values.

6. The computer-implemented method of claim 1, further comprising:
   receiving a request from the client computing device for a remaining portion of the content item, and
   transmitting the remaining portion of the content item to the client computing device.

7. The computer-implemented method of claim 6, wherein the request for the remaining portion of the content item is generated based on a determination that the content item is to be presented on the client computing device.

8. The computer-implemented method of claim 1, further comprising:
   receiving, from the client computing device, a request for a first portion of a second content item, wherein the first portion of the second content item is determined based on a likelihood of consumption value associated with the second content item; and
   transmitting the first portion of the second content item to the client computing device, wherein the first portion of the second content item is prefetched.

9. The computer-implemented method of claim 1, further comprising:
   determining the likelihood of consumption value associated with the content item based on user characteristics associated with the user.

10. A system comprising:
    at least one processor; and
    a memory storing instructions that, when executed by the at least one processor, cause the system to perform a method comprising:
      identifying a content item for potential presentation on a client computing device associated with a user;
      transmitting to the client computing device a likelihood of consumption value associated with the content item and the user;
      receiving, from the client computing device, a request for a first portion of the content item, wherein
      the content item is an image divided into a plurality of segments, a number of segments of the plurality of segments to be prefetched is determined based on the likelihood of consumption value, the first portion comprises a subset of the plurality of segments determined based on the number of segments, and the first portion is associated with a reduced quality representation of the image; and transmitting the first portion of the content item to the client computing device.

11. The system of claim 10, wherein each segment of the plurality of segments is associated with rendering the content item at a particular level of quality.

12. The system of claim 11, wherein the plurality of segments are ordered in an order such that higher placement within the order is indicative of a higher level of quality.

13. The system of claim 12, wherein the content item can be rendered at a first quality based on a first segment at a first position in the order, and the content item can be rendered at a second quality that is higher than the first quality based on the first segment and a second segment at a second position in the order.

14. The system of claim 10, wherein the instructions cause the system to perform the method further comprising:

receiving a request from the client computing device for a remaining portion of the content item, and transmitting the remaining portion of the content item to the client computing device.

15. The system of claim 14, wherein the request for the remaining portion of the content item is generated based on a determination that the content item is to be presented on the client computing device.

16. A non-transitory computer-readable storage medium including instructions that, when executed by at least one processor of a computing system, cause the computing system to perform a method comprising:

identifying a content item for potential presentation on a client computing device associated with a user;

transmitting to the client computing device a likelihood of consumption value associated with the content item and the user;

receiving, from the client computing device, a request for a first portion of the content item, wherein the content item is an image divided into a plurality of segments, a number of segments of the plurality of segments to be prefetched is determined based on the likelihood of consumption value, the first portion comprises a subset of the plurality of segments determined based on the number of segments, and the first portion is associated with a reduced quality representation of the image; and transmitting the first portion of the content item to the client computing device.

17. The non-transitory computer-readable storage medium of claim 16, wherein each segment of the plurality of segments is associated with rendering the content item at a particular level of quality.

18. The non-transitory computer-readable storage medium of claim 17, wherein the plurality of segments are ordered in an order such that higher placement within the order is indicative of a higher level of quality.

19. The non-transitory computer-readable storage medium of claim 18, wherein the content item can be rendered at a first quality based on a first segment at a first position in the order, and the content item can be rendered at a second quality that is higher than the first quality based on the first segment and a second segment at a second position in the order.

20. The non-transitory computer-readable storage medium of claim 16, wherein the instructions cause the computing system to perform the method further comprising:

receiving a request from the client computing device for a remaining portion of the content item, and transmitting the remaining portion of the content item to the client computing device.

* * * * *